United States Patent
Morimura (10) Patent No.: US 8,473,632 B2
(45) Date of Patent: Jun. 25, 2013

(54) PACKET RECEIVING APPARATUS AND PROCESSING METHOD FOR THE SAME

(75) Inventor: Kazuhiko Morimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 612 days.

(21) Appl. No.: 12/431,537

(22) Filed: Apr. 28, 2009

(65) Prior Publication Data

US 2009/0287843 A1    Nov. 19, 2009

(30) Foreign Application Priority Data

May 14, 2008 (JP) .................................. 2008-127381

(51) Int. Cl.
*G06F 15/16* (2006.01)

(52) U.S. Cl.
USPC ............................ 709/236; 709/230; 709/235

(58) Field of Classification Search
USPC .................. 726/5, 4, 3, 26, 23; 709/250, 237, 709/245, 238, 236, 231, 230, 224, 223, 219, 709/212, 211, 209, 201, 23; 370/476, 474, 370/470, 469, 466, 429, 419, 412, 42, 400, 370/395.52

See application file for complete search history.

(56) References Cited

U.S. PATENT DOCUMENTS

| | | | |
|---|---|---|---|
| 6,894,976 B1 * | 5/2005 | Banga et al. | 370/235 |
| 2006/0251129 A1 | 11/2006 | Morimura et al. | |
| 2007/0011560 A1 * | 1/2007 | Backman et al. | 714/758 |
| 2008/0002567 A1 * | 1/2008 | Bourlas et al. | 370/208 |

FOREIGN PATENT DOCUMENTS

| | | |
|---|---|---|
| JP | 5-327771 | 12/1993 |
| JP | 2007-267182 | 10/2007 |
| JP | 2008-92082 | 4/2008 |
| JP | 2007-215013 | 5/2009 |

OTHER PUBLICATIONS

Defense Advanced Research Projects Agency, RFC: 791Darpa Internet Program Protocol Specificaiton, Sep. 1981, http://www.ietf.org/rfc/rfc791.txt.*
Japanese Office Action dated Jun. 1, 2012 issued during prosecution of related Japanese application No. 2008-127381.
Japanese Office Action dated Aug. 17, 2012, issued during prosecution of related Japanese application No. 2008-127381.

* cited by examiner

*Primary Examiner* — David Lazaro
*Assistant Examiner* — Charles Murphy
(74) *Attorney, Agent, or Firm* — Fitzpatrick, Cella, Harper & Scinto (57) ABSTRACT

A packet receiving apparatus determines whether or not data to be stored in a buffer overlaps previously stored data based on information contained in a header portion of a received packet. If it is determined that the data overlaps, a checksum for the overlapping data is subtracted. If it is determined that the data does not overlap, a checksum for the data to be stored in the buffer is added.

9 Claims, 5 Drawing Sheets

PACKET RECEIVING APPARATUS AND PROCESSING METHOD FOR THE SAME

BACKGROUND OF THE INVENTION

1. Field of the Invention

The present invention relates to a packet receiving apparatus that verifies reassembled packets, and a processing method for the same.

2. Description of the Related Art

As protocols for communication networks, protocols such as TCP/IP and UDP/IP are used. TCP/IP is an abbreviation for Transmission Control Protocol/Internet Protocol, and UDP/IP is an abbreviation for User Datagram Protocol/Internet Protocol.

In networks using such protocols, the total length of one packet at the IP layer can be defined as up to 65535 octets (1 octet=8 bits) according to specifications. However, at the data link layer below the IP layer, for example in IEEE 802.3, the maximum transfer unit that can be transmitted as one packet is limited to 1492 octets. The maximum transfer unit will hereinafter be referred to as the MTU (Maximum Transfer Unit).

Different lengths of MTUs are employed depending on the data link layer, such as 1500 octets for Ethernet (R), 576 octets for dial-up connections via telephone lines, and 4352 octets for Fibre Channel.

In a case such as where the packet length handled at the IP layer is longer than the MTU at the data link layer, or where a packet is to be transferred to a network with the MTU smaller than the MTU of the current network, the original IP packet needs to be divided before being passed to the data link layer. The mechanism of this dividing is known as IP fragmentation.

Japanese Patent Laid-Open No. 05-327771 discloses a technique of transferring packets to a certain destination without packet overlaps by indicating to a transfer circuit a packet descriptor that represents information on storage locations of fragment packets.

Japanese Patent Laid-Open No. 2007-215013 discloses a technique of switching between checksum calculation methods depending on whether or not fragment packets have sequentially arrived in order without overlaps.

However, the above conventional IP fragmentation processing methods have had a problem as follows. While TCP/UDP, ICMP, and the like are used as upper protocols for an IP packet before being fragmented, these protocols have a checksum field as header information. The validity of the packet in question is determined based on the consistency of a checksum.

To calculate this checksum, it is necessary to calculate the 1's complement sum of every 2 octets, that is, the Internet checksum defined in RFC 1071, for the following: an IP pseudo header made of part of the IP header; the TCP (UDP) header; and the payload. For this purpose, the calculation is performed by again reading out header/payload information from memory in which reassembly has been performed.

In addition, the reassembly of fragments undergoes a process in which all received fragment packets are temporarily accumulated and reordered before being reassembled into a datagram. Therefore, the reception performance decreases in a network in which IP fragment packets occur, and this has been another problem.

SUMMARY OF THE INVENTION

The present invention provides a packet receiving apparatus that allows processing from the reception of fragment packets to the completion of verification of a reassembled packet to be performed at a high-speed.

According to one aspect of the present invention, there is provided a packet receiving apparatus, comprising: a determination unit that determines whether or not data to be stored in a buffer overlaps previously stored data based on information contained in a header portion of a received packet; and a calculation unit that subtracts a checksum for the overlapping data if it is determined by the determination unit that the data overlaps, and adds a checksum for the data to be stored in the buffer if it is determined by the determination unit that the data does not overlap.

Further features of the present invention will become apparent from the following description of exemplary embodiments (with reference to the attached drawings).

DESCRIPTION OF THE EMBODIMENTS

With reference to the drawings, the best mode for implementing the present invention will be described in detail below.

Figure 1:
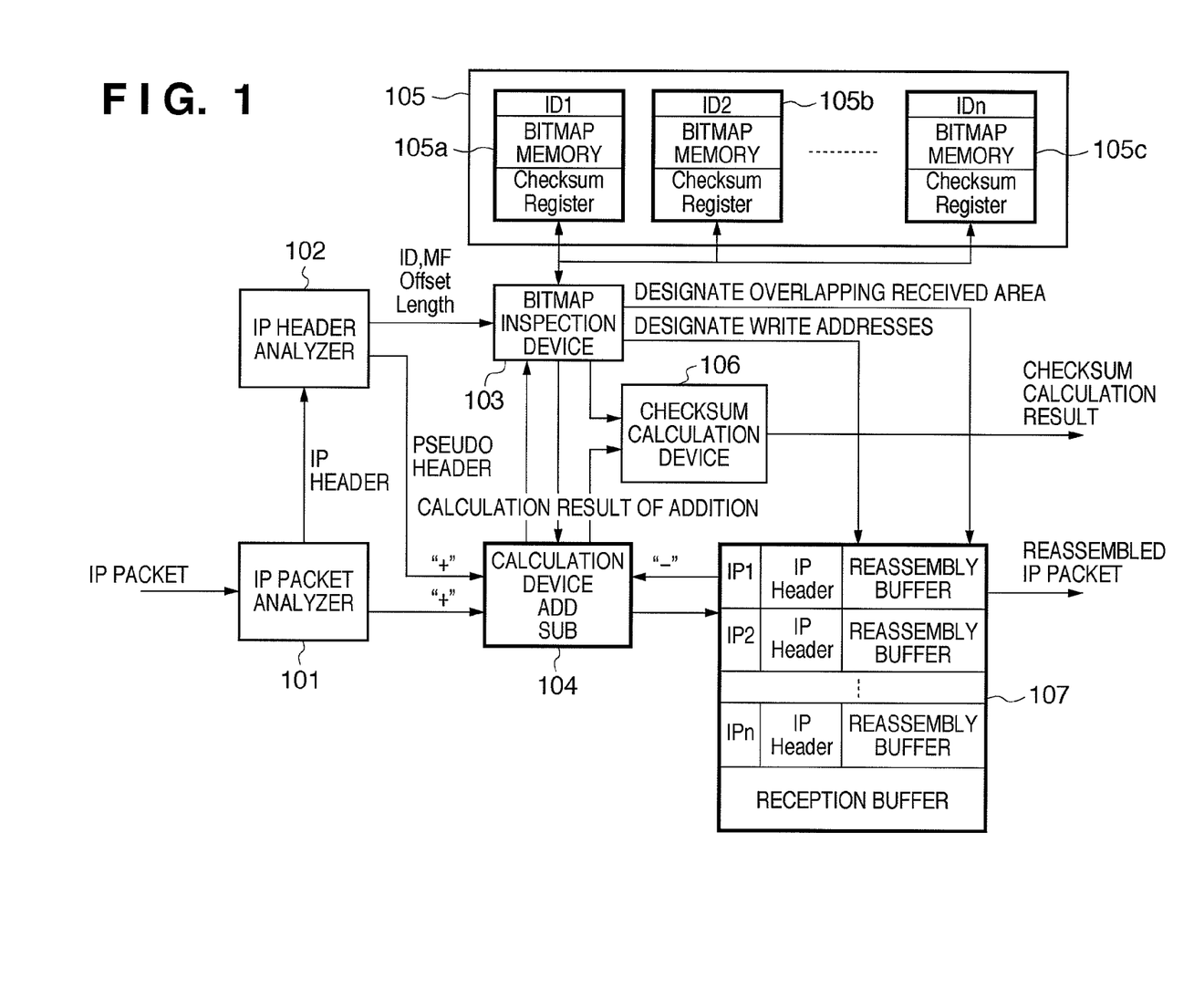
FIG. 1 is a diagram showing an exemplary configuration of a reception processing unit in a protocol processing apparatus.

FIG. 1 is a diagram showing an exemplary configuration of a reception processing unit in a protocol processing apparatus. In FIG. 1, reference numeral 101 denotes an IP packet analyzer, which separates a received IP packet into a header portion and a payload portion. Reference numeral 102 denotes an IP header analyzer, which analyzes the header portion of the IP packet separated in the IP packet analyzer 101. Reference numeral 103 denotes a bitmap inspection device, which manages the reception condition of fragment packets and manages the location in a buffer (to be described later) to which the payload portion separated in the IP packet analyzer 101 is written.

Reference numeral 104 denotes a calculation device, which, in order to calculate a checksum, adds data of the payload portion or subtracts data from a reassembly buffer. Reference numeral 105 denotes a bitmap memory, which manages the reception condition of a plurality of IP packets being reassembled, and at the same time, stores checksum values being calculated.

Reference numeral 106 denotes a checksum calculation device, which calculates a final checksum from the result of the calculation in the calculation device 104 and an interim result of the checksum calculation stored in the bitmap memory 105 and outputs the final checksum. Reference numeral 107 denotes a reassembly buffers/reception buffer, in which IP packets being reassembled, unfragmented IP packets, and the like are temporarily stored.

In the above configuration, operation where an unfragmented IP packet is received will be described. A frame received in a PHY device (not shown) is input to a MAC device (not shown), where frame verification is performed throughout the frame by using an FCS (Frame Check Sequence). The MAC device compares a calculated FCS with an FCS in the last 4 octets of the packet. If they are the same value, the IP packet is input to the IP packet analyzer 101. If they are different values, the received packet is discarded as a packet containing an error.

Here, the format of an IP packet that is input to the IP packet analyzer 101 will be described with reference to FIG. 2.

Figure 2:
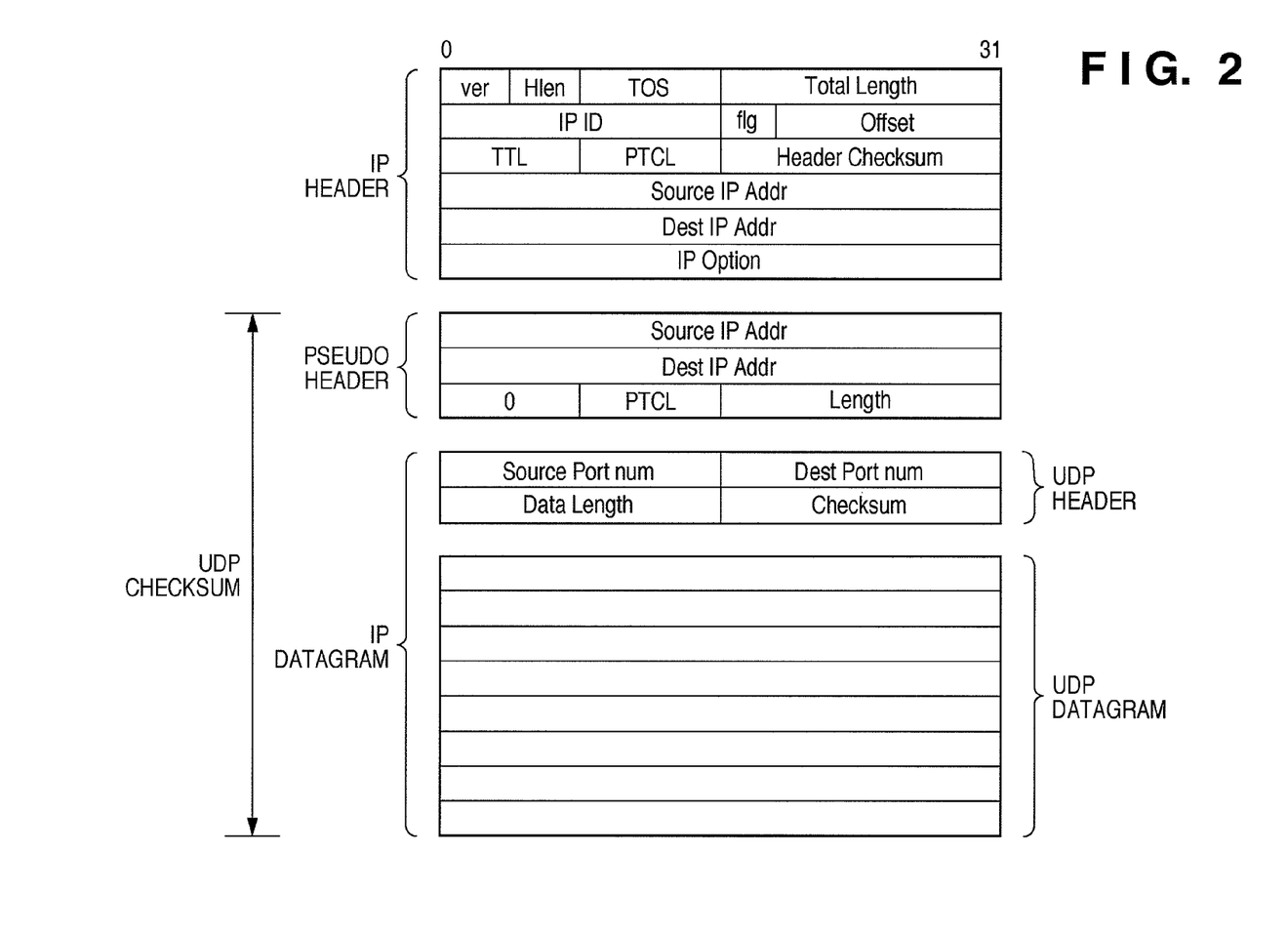
FIG. 2 is a diagram showing the format of an IPv4 packet at the IP layer.

FIG. 2 is a diagram showing the format of an IPv4 packet at the IP layer. As shown in FIG. 2, an IPv4 header consists of 20 octets at the minimum, from a ver field to Dest IP Addr. At the beginning of the IP header is the ver field of 4 bits indicating the version, and it is represented as "0100=4" in the case of IPv4. Subsequently, the header length of 4 bits is indicated as Hlen in units of 4 octets. Therefore, if Option is not in multiples of 4 octets, padding data is added to adjust the header size to multiples of 4 octets. For example, if Option does not exist, Hlen is "0101" and the header length is 20 octets (5×4 octets). Once the header length is identified, the input IP packet can be separated into the IP header portion and the IP datagram portion.

A Total Length field is a total length storage area indicating the total length of the IP packet including its IP header. This is represented in 16 bits, so that the maximum length of the IP packet is represented as 65535 octets. Since the end of the payload can be known from the IP packet length (Total Length), the packet length and the payload length can be checked when the IP header and the payload are separated.

IPID is a unique identifier (ID) assigned to the IP datagram. IPID can prevent IP datagrams with the same IPID from being separately processed in the case such as where an IP datagram is fragmented on its way in the network, or where a duplicate of an IP packet occurs.

Flag and Offset are fields used when IP fragmentation is performed in the path. The IP packet analyzer 101 inputs the IP header to the IP header analyzer 102, where an MF bit contained in the Flag field and the value of the Offset field in the IP header are checked. In the case of an unfragmented IP packet, the MF bit indicating the presence of the following fragment packet and the value of the Offset field indicating the offset position of the fragment packet are both "0".

If the MF bit is "1", it indicates the presence of the following IP fragment packet. If the Offset field is provided with a value, the value indicates the offset position of the IP fragment packet after reassembly. The value of the MF bit, the value of the Offset field, and the value of the IPID checked here are passed to the bitmap inspection device 103.

A PTCL field indicates the type of a protocol located at the upper layer for the IP packet. A Header Checksum field is provided with the Internet checksum defined in RFC 1071 for only the IP header portion. Source IP Addr, which is a source IP address, and Dest IP Addr, which is a destination IP address are indicated, and thus the IP header is configured.

On the other hand, the IP header analyzer 102 assembles a pseudo header for checksum calculation. The pseudo header contains the source IP address, destination IP address, protocol type, and packet length in the IP header that are used in calculating a checksum value in the TCP/UDP header and ICMP header, which are headers of L4 protocols.

As to the packet length, in one technique, the IP packet length after reassembly is calculated as Offset+Total Length described in the header of a fragment packet having MF of "0". In another technique, the IP packet length after reassembly is known by analogy beforehand by analyzing the L4 header of a packet having Offset of "0".

The latter technique is effective for UDP and ICMP. For TCP, the total length is calculated from the IP header because TCP has no field indicating the packet length. The pseudo header extracted in this manner is provided to the calculation device 104 and added as part of the checksum to be calculated.

In the bitmap inspection device 103, the IP packet is processed as an unfragmented IP packet because Offset and MF are "0". In the case of an unfragmented IP packet, the bitmap memory 105 is not used and the bitmap inspection device 103 designates a reception buffer area as a write area in the reassembly buffers/reception buffer 107. While reassembly requires preparing a buffer of 64 KB at the maximum per ID, the reception buffer area only requires a capacity for the MTU plus a max header, for example, 1500+14 bytes for Ethernet (R).

The received packet is written via the calculation device 104 to the write addresses designated in this manner in the reception buffer of the reassembly buffers/reception buffer 107. At the stage where the transfer of the amount corresponding to Total Length described in the IP header is finished, a checksum calculation result is output according to a calculation result provided from the calculation device 104, and at the same time, the IP packet is output from the reassembly buffers/reception buffer 107.

Thus, with respect to the reception of an unfragmented IP packet, the checksum-based verification of the IP packet and the output of the packet can be performed almost simultaneously.

Next, description will be given of the case where a plurality of IP-fragmented IP packets is received with their received areas overlapping.

Figure 3:
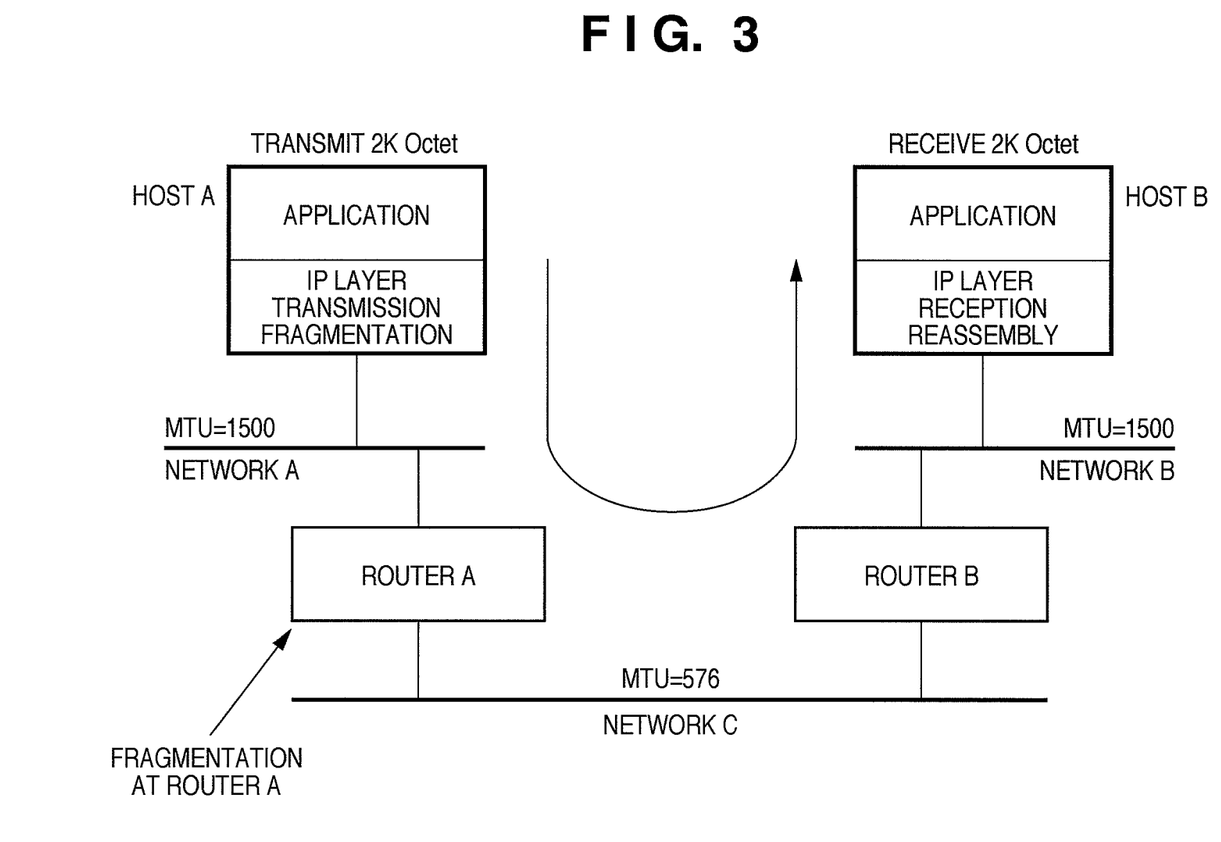
FIG. 3 is a diagram showing an exemplary network configuration in which IP fragmentation occurs.

FIG. 3 is a diagram showing an exemplary network configuration in which IP fragmentation occurs. As shown in FIG. 3, hosts A and B are connected to networks A and B respectively, and the networks A and B have an MTU of 1500 octets. An environment is constructed such that the hosts A and B can communicate with each other via routers A and B over a network C with an MTU of 576 octets.

Here, description will be given of the case where an application in the host A transmits an IP datagram (2000 octets) from its IP layer to the host B. First, since the MTU of the network A is 1500 octets, the IP layer of the host A divides the IP datagram in order to have IP packets of 1500 octets. Specifically, the IP datagram is divided into an IP packet having a datagram of 1480 octets resulting from subtracting 20 octets of the IP header length, and an IP packet having a datagram of the remaining 520 octets. The IP packets are transmitted for the network B, so that the router A having received the packets performs IP packet transfer that meets the MTU of 576 octets in order to direct the packets to the network C.

In this case, the IP packet of 1480 octets is IP-fragmented into two IP packets of 572 octets, each having a datagram of 552 octets, and an IP packet of 396 octets having a datagram of 376 octets. The following IP packet of 520 octets is transferred as it is. On the other hand, for the transfer from the network with the MTU of 576 octets to the network with the MTU of 1500 octets, processing such as the IP fragmentation does not need to be specially performed.

Figure 4:
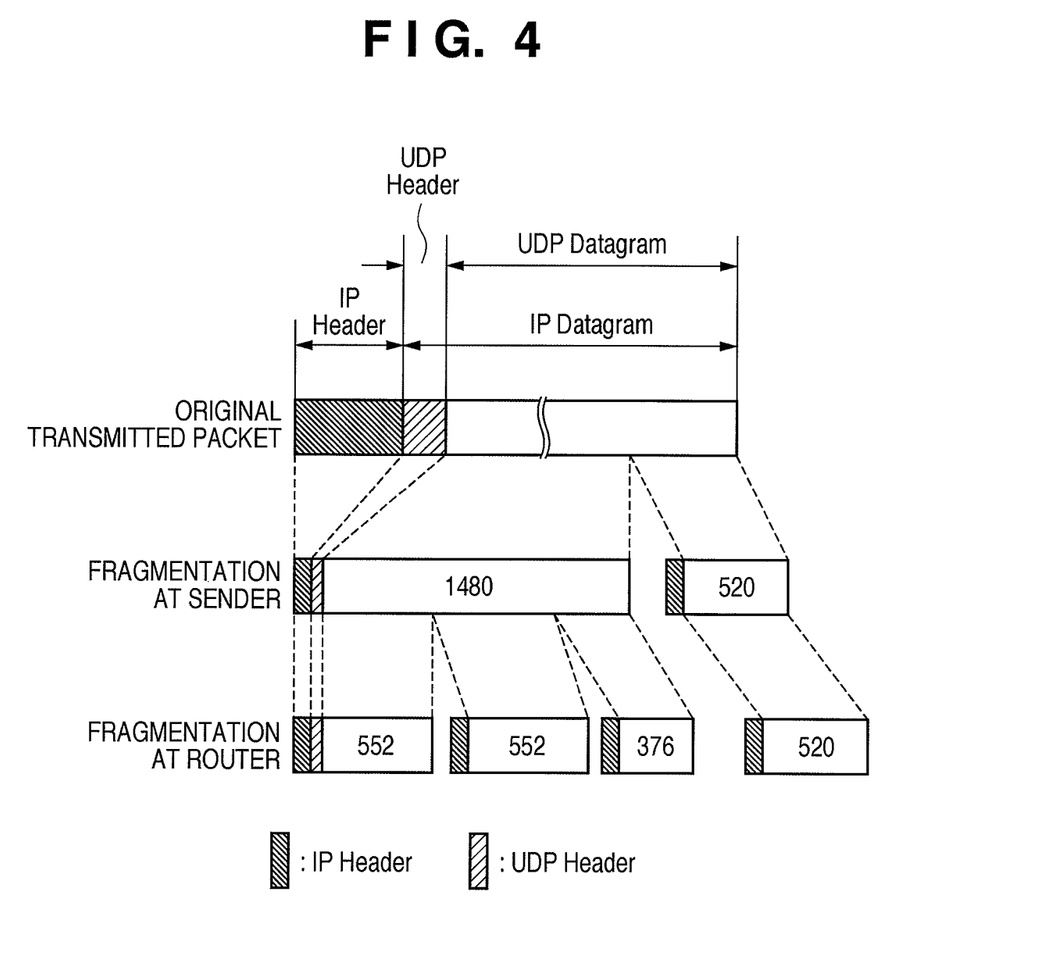
FIG. 4 is a diagram for illustrating fragmentation processing of IP packets.

In this manner, the data of 2000 octets transmitted from the application in the host A is divided into the four IP packets as shown in FIG. 4 before arriving at the host B. When the data of 2000 octets transmitted by the host A arrives, an application in the host B performs reassembly processing at the IP layer of the host B.

The four IP-fragmented packets having arrived at the host B have the same IPID described in their respective IP headers.

Therefore, it can be known that these packets were originally one IP packet, that is, these packets are IP packets to be subjected to the reassembly processing. Further, from Total Length, Offset, and the More Fragment (MF) bit described in the Flag field, it is determined where each packet occupied in the packet before the IP fragmentation. Thus, the packets can be reassembled into the original IP packet.

If UDP was used for the IP packet before the fragmentation, the UDP header from the beginning to the end undergoes the fragmentation-reassembly as the IP datagram. Therefore, in the host B, UDP processing can be performed after the reassembly is finished and the IP datagram is completed.

In the example shown in FIG. 3, there is only one path via which the IP packets from the host A arrives at the host B. Therefore, overlaps of IP datagrams do not occur even though the fragmentation occurs. However, in the case where network interfaces with different MTUs are link-aggregated, or in a network having a plurality of paths, packets fragmented with different MTUs may arrive. Also, a switching hub that has not learned network addresses may generate a large amount of duplicate packets, causing identical packets to arrive at different times.

Figure 5:
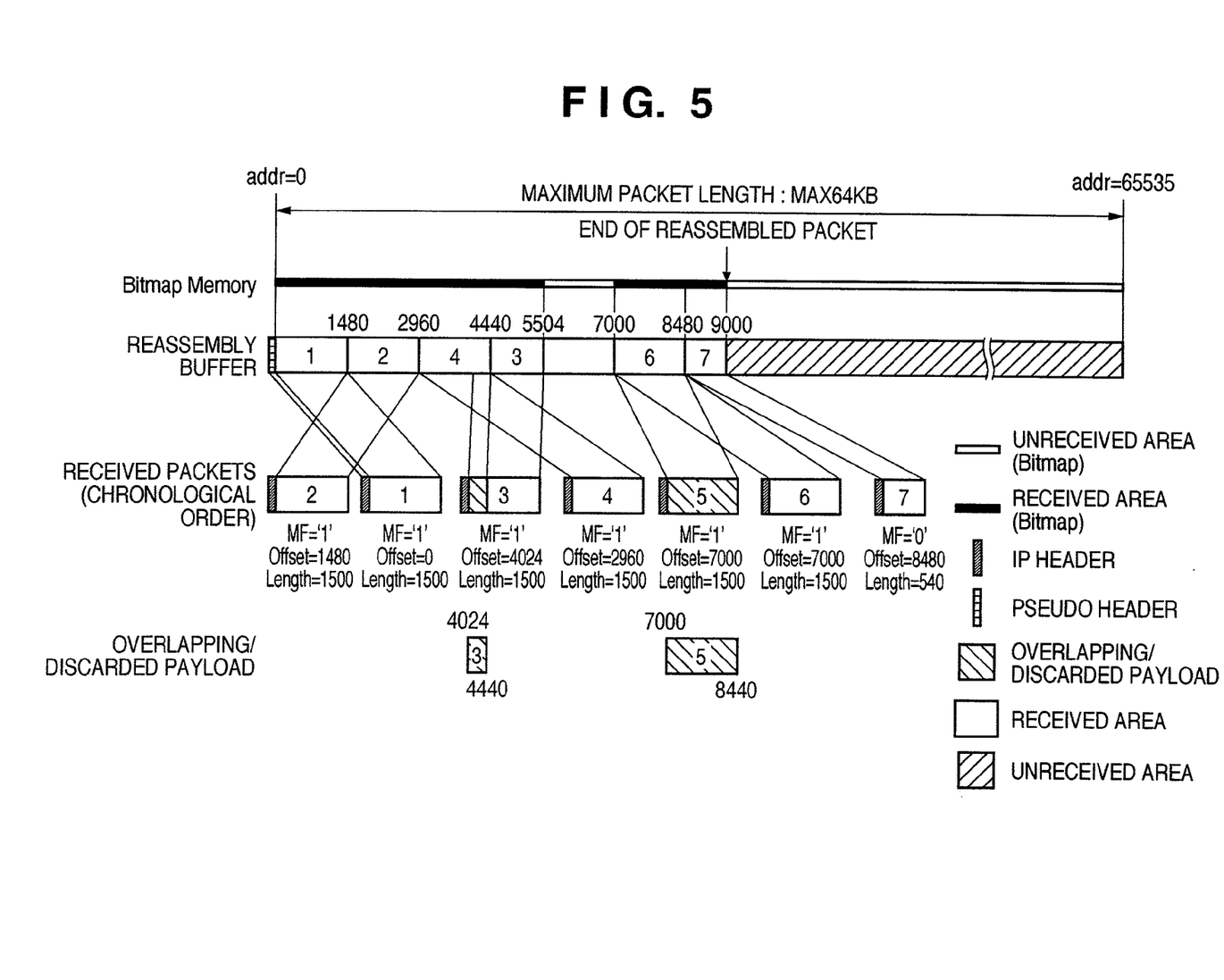
FIG. 5 is a diagram showing the case where sequentially received fragment packets overlap received areas of an IP datagram being recovered.

FIG. 5 is a diagram showing the case where sequentially received fragment packets overlap received areas of an IP datagram being recovered. First, a packet 2 with the MF "1", Offset 1480, and Length 1500 is received. The IP header analyzer 102 analyzes the packet 2 and identifies it as a fragment IP packet because MF and Offset are both not 0. Information on IPID, MF, Offset, and Length is passed to the bitmap inspection device 103, where an ID of one unit of the bitmap memory 105 is assigned.

Each unit of the bitmap memory 105 has memory for identifying received areas of fragment packets and a checksum register for holding an interim result of checksum calculation, and is managed with an ID. The memory for managing received areas allocates 1 bit of memory per received 8 octets, and has a capacity of 8 KB per ID for accommodating the maximum IP packet of 64 KB. This ID is associated with the IPID by the bitmap inspection device 103, so that IP fragment packets with a plurality of IPIDs can be reassembled. The ID is further associated with an ID of the reassembly/reception buffers and used for reassembly management.

Here, since Length of the received packet is the length including the IP header, 20 octets are subtracted from 1500 octets and the payload to be reassembled will be 1480 octets. As a result, in the bitmap memory 105, "1" is set for 1480 to 2960 indicating that this area has been received, and the IPID is recorded.

The bitmap inspection device 103 then notifies write addresses in the reassembly buffers/reception buffer 107. According to these addresses, the payload from the calculation device 104 is recorded in a payload length storage area in the reassembly/reception buffers 107. When the payload indicated by Length has been recorded in the reassembly buffers/reception buffer 107 via the calculation device 104 in this manner, the calculation device 104 notifies the bitmap inspection device 103 of the result of the addition. The result of the addition is held in the checksum register in the unit of the bitmap memory 105 having the corresponding ID.

Subsequently, a packet 1 with the same IPID as the preceding packet 2 is received. Since Offset is 0, the packet 1 is an IP packet that will come to the top of the payload after reassembly. Since Length is 1500, 0 to 1480 are received in the same manner as for the preceding packet 2. Here, to check for an overlapping received area, the bitmap inspection device 103 reads out the bitmap from the bitmap memory 105 and checks the presence or absence of a received area in 0 to 1480. In this case, it is confirmed that the entire received area has not been received before, so that the reassembly buffers/reception buffer 107 is notified of nothing and only has write addresses designated.

If the top packet like the packet 1 is received, the IP header analyzer 102 generates the pseudo header and records it in the reassembly buffers/reception buffer 107 via the calculation device 104. In this manner, the checksum calculation including the pseudo header is possible.

Next, a calculation method in the case where an overlapping received area exists will be described. A packet 3 is received followed by the reception of a packet 4, and the bitmap inspection device 103 compares the received areas read out from the bitmap memory 105 with the received area of the currently received packet 4. The packet 3 has Offset 4024 and Length 1500, and the packet 4 has Offset 2960 and Length 1500. Therefore, as the result of the comparison, it is determined that 416 octets from 4024 to 4440 overlap. It is to be noted that, as to the payload data, overlapping data is overwritten with the packet received later.

Thus, the bitmap inspection device 103 outputs two pieces of information to the reassembly buffers/reception buffer 107: that the overlapping received area is 4024 to 4440, and that the write addresses are 2960 to 4440. When an overlapping received area exists, the calculation device 104 subtracts the overlapping received area recorded in the reassembly buffers/reception buffer 107 before writing the payload. The subtracted area can be overwritten with the newly received payload data.

Similar processing is performed also in the case where received areas completely overlap, as in the case of packets 5 and 6. The reassembly buffers/reception buffer 107 is notified of the overlapping area 7000 to 8480. Here, before the packet 6 is written to the buffer, previously read data is subtracted. Then, the addition processing and the writing processing to the reassembly buffers/reception buffer 107 are performed.

Thereafter, when a packet 7 with MF "0" is received, the end of the IP packet after reassembly is identified from Total Length and Offset of the packet 7. This position is stored by the bitmap inspection device 103. Once the end is identified, it is checked whether or not the bitmap memory areas have been received from the beginning to the end in the reception of the fragment packets. When it is determined that the areas from the beginning to the end have been received, the length (total length or payload length) of the IP packet after reassembly or the packet in the upper protocol is identified. The length (total length or payload length) of the reassembled packet is written to the total length storage area or the payload length storage area in the IP header in the reassembly buffers/reception buffer 107.

When all the areas have been received, the reassembly is completed. The checksum calculation device 106 is notified of the value of the checksum register as the interim calculation result, and the checksum result for the last packet from the calculation device 104. Then, the checksum calculation result can be output, and at the same time, the reassembled IP packet can be output from the reassembly buffers/reception buffer 107.

Since packets with various IPIDs are received during the reassembly of fragment packets, parallel processing of the reassembly for a plurality of IPIDs is required. For this purpose, the bitmap memory 105 has a capacity capable of processing for a plurality of IDs corresponding to respective IPIDs and has respective checksum registers. That is, the bitmap memory 105 includes the units 105a, 105b, 105c, and so on shown in FIG. 1. Further, the reassembly buffers/reception buffer 107 also needs to have a capacity corresponding to the bitmap memory 105.

The bitmap inspection device 103 manages the IDs of the bitmap memory 105 and the IDs of the reassembly/reception buffers 107, corresponding to the IPIDs of the fragment packets. The bitmap inspection device 103 holds these IDs until the reassembly is completed.

In this embodiment, in the reception of an IP packet, particularly in the reception of a fragmented IP packet, IP fragment packets are received and at the same time the checksumming of the payload portion and the reassembly of the IP packet are performed while checking the received areas. Once the completion of reception of all the fragment packets is detected, the pseudo header is generated from the IP header and the checksum for the pseudo header is calculated. From the aforementioned checksum for the payload portion and the checksum for the pseudo header, checksum-based verification at the transport layer is performed.

Thus, the time for completing the process from the reception of fragment packets to the verification of a reassembled packet is reduced compared to the conventional examples, and this enables fast processing.

It is to be understood that objects of the present invention may also be achieved in such a manner that a recording medium having recorded thereon a program code of software implementing the functions of the above-described embodiment is supplied to a system or apparatus, and a computer of the system or apparatus reads out the program code stored in the recording medium and executes the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-127381, filed May 14, 2008, which is hereby incorporated by reference herein in its entirety.

What is claimed is:

1. A receiving apparatus that receives a plurality of fragmented packets from which a predetermined packet has been divided, comprising:
   a storage unit that stores a first checksum value corresponding to received data;
   a determination unit that determines, based on information contained in a header portion of a newly received fragmented packet, an overlap between the received data and data contained in the newly received fragmented packet;
   a reassembly unit that performs reassembly into the predetermined packet based on the plurality of received fragmented packets;
   a calculation unit that, before reception of the plurality of fragmented packets required for the reassembly into the predetermined packet by the reassembly unit is completed, calculates a second checksum value corresponding to the overlap and a third checksum value corresponding to the data contained in the newly received fragmented packet; and
   a control unit that stores, in the storage unit as a new checksum value, a value in which the third checksum value is added to a value in which the second checksum value is subtracted from the first checksum value.

2. The receiving apparatus according to claim 1, wherein the reassembly unit performs the reassembly into the predetermined packet based on a bitmap memory for managing a reception condition of the plurality of fragmented packets.

3. The receiving apparatus according to claim 1, wherein the information contained in the header portion of the fragmented packet is at least an offset position and a fragmented packet length.

4. The receiving apparatus according to claim 1, wherein said calculation unit calculates the third a checksum value excluding data in a predetermined area among the data contained in the newly received fragmented packet.

5. The receiving apparatus according to claim 1, wherein said calculation unit calculates the third checksum value after an IP header is extracted from the newly received fragmented packet and a pseudo header is assembled.

6. The receiving apparatus according to claim 1, further comprising a writing unit that calculates a total length or a payload length of the predetermined packet reassembled from the plurality of fragmented packets and writes the calculated total length or payload length of the reassembled packet to a total length storage area or a payload length storage area in an IP header in the buffer.

7. The receiving apparatus according to claim 1, further comprising an output unit that outputs the predetermined packet reassembled from the plurality of fragmented packets when the reception of the plurality of fragmented packets is completed.

8. A processing method for a receiving apparatus that receives a plurality of fragmented packets from which a predetermined packet has been divided, comprising:
   storing, in a storage unit, a first checksum value corresponding to received data;
   determining, based on information contained in a header portion of a newly received fragmented packet, an overlap between the received data and data contained in the newly received fragmented packet;
   reassembling into the predetermined packet based on the plurality of received fragmented packets;
   calculating, before reception of the plurality of fragmented packets required for the reassembly into the predetermined packet by the reassembling step is completed, a second checksum value corresponding to the overlap, and a third checksum value corresponding to the data contained in the newly received fragmented packet; and
   storing, in the storage unit as a new checksum value, a value in which the third checksum value is added to a value in which the second checksum value is subtracted from the first checksum value.

9. A non-transitory computer-readable storage medium having stored thereon a program for causing a computer to execute a processing method for a receiving apparatus that receives a plurality of fragmented packets from which a predetermined packet has been divided, the program comprising the steps of:
   storing, in a storage unit, a first checksum value corresponding to received data;
   determining, based on information contained in a header portion of a newly received fragmented packet, an overlap between the received data and data contained in the newly received fragmented packet;
   reassembling into the predetermined packet based on the plurality of received fragmented packets;
   calculating, before reception of the plurality of fragmented packets required for the reassembly into the predetermined packet by the reassembling step is completed, a second checksum value corresponding to the overlap, and a third checksum value corresponding to the data contained in the newly received fragmented packet; and
   storing, in the storage unit as a new checksum value, a value in which the third checksum value is added to a value in which the second checksum value is subtracted from the first checksum value.

* * * * *